US009871462B2

(12) United States Patent
Medagam et al.

(10) Patent No.: US 9,871,462 B2
(45) Date of Patent: Jan. 16, 2018

(54) REGENERATIVE VARIABLE FREQUENCY DRIVE WITH AUXILIARY POWER SUPPLY

(71) Applicant: Phase Technologies, LLC, Rapid City, SD (US)

(72) Inventors: Peda V. Medagam, Rapid City, SD (US); Theodore Clifton Pettyjohn, Rapid City, SD (US); Jack Yang, Rapid City, SD (US)

(73) Assignee: Phase Technologies, LLC, Rapid City, SD (US)

( * ) Notice: Subject to any disclaimer, the term of this patent is extended or adjusted under 35 U.S.C. 154(b) by 0 days.

(21) Appl. No.: 15/373,913

(22) Filed: Dec. 9, 2016

(65) Prior Publication Data

US 2017/0170743 A1 Jun. 15, 2017

Related U.S. Application Data

(60) Provisional application No. 62/266,135, filed on Dec. 11, 2015.

(51) Int. Cl.
*H02M 5/458* (2006.01)
*H02M 1/088* (2006.01)
*H02M 1/00* (2006.01)

(52) U.S. Cl.
CPC ............ *H02M 5/458* (2013.01); *H02M 1/088* (2013.01); *H02M 2001/0006* (2013.01)

(58) Field of Classification Search
CPC ......... H02M 5/458; H02M 2001/0006; H02M 1/088
See application file for complete search history.

(56) References Cited

U.S. PATENT DOCUMENTS

| 5,572,417 A | 11/1996 | Vinciarelli et al. |
| 5,621,631 A | 4/1997 | Vinciarelli et al. |
| 7,046,534 B2 | 5/2006 | Schmidt et al. |
| 7,164,242 B2 | 1/2007 | Federman et al. |

(Continued)

OTHER PUBLICATIONS

Li et al., Use of Hybrid PWM and Passive Resonant Snubber for a Grid-Connected CSI, IEEE Transactions on Power Electronics, Feb. 2010, 298-309, 25-2, IEEE.

(Continued)

*Primary Examiner* — Jue Zhang
*Assistant Examiner* — Lakaisha Jackson
(74) *Attorney, Agent, or Firm* — Ancel W. Lewis, Jr.; Cochran Freund & Young, LLC

(57) ABSTRACT

A regenerative variable frequency drive includes an active converter connected to a DC bus that is connected to a first inverter that converts DC power to variable frequency, three phase AC power, and variable frequency, three phase AC power to DC power, and to a second inverter that converts DC power to three phase AC sine wave power. The converter converts single phase AC power to DC power and DC power to single phase AC power, and maintains a selected voltage on the DC bus. The converter has an active rectifier and a controller that drives the rectifier with a pulse width modulation according to a hybrid voltage switching scheme that switches the rectifier according to a unipolar voltage switching scheme through most of each cycle and switches the rectifier according to a bipolar voltage switching scheme around each zero crossing.

21 Claims, 5 Drawing Sheets

(56) References Cited

U.S. PATENT DOCUMENTS

| | | |
|---|---|---|
| 8,537,585 B2 | 9/2013 | Ku et al. |
| 2013/0016543 A1 | 1/2013 | Ku et al. |
| 2013/0127381 A1* | 5/2013 | Meiners .............. H02M 5/4585 318/376 |
| 2015/0009723 A1* | 1/2015 | Taguchi .................. H02P 27/06 363/34 |
| 2016/0036316 A1* | 2/2016 | Momota ................ H02M 1/08 363/78 |
| 2017/0005562 A1* | 1/2017 | Agirman ................ B66B 1/302 |

OTHER PUBLICATIONS

Latha, R and Walter Raja Rajan.B., An Improved CSI with the Use of Hybrid PWM and Passive Resonant Snubber, International Journal of Advances in Electrical and Electronics Engineering, 158-166, 2-1, IJAEEE.

* cited by examiner

US 9,871,462 B2

REGENERATIVE VARIABLE FREQUENCY DRIVE WITH AUXILIARY POWER SUPPLY

TECHNICAL FIELD

The present invention relates to variable frequency drives and more particularly to a regenerative variable frequency drive with an active converter that converts with a hybrid voltage switching method from single-phase AC input to DC, and from DC to three-phase variable frequency AC output and to three-phase sine wave AC output.

BACKGROUND ART

A variable frequency drive controls the speed and torque of an alternating current (AC) motor by varying the input frequency and voltage. Three-phase motors provide higher mechanical efficiency, higher power factor and less torque ripple than single-phase motors and are therefore a more desirable choice. Variable frequency drives in the past have generally included a diode rectifier, that converts AC power to direct current (DC) power, connected through a DC bus to an inverter that supplies three phase, variable frequency AC power to a three-phase motor.

When a motor turns faster than the speed designated by the variable frequency drive, the motor acts as a generator, generating power that is returned to the DC bus. In a variable frequency drive with a diode rectifier, the rectification of the AC power to the DC bus is a one-way street and the generated power causes the voltage on the DC bus to rise.

One known method of handling the generated power is to add a dynamic braking resistor to the variable frequency drive. When the voltage on the DC bus rises due to the generated power, the generated power is shunted to the dynamic braking resistor that converts the generated power to heat. Dynamic braking resistors add complexity and expense to a variable frequency drive installation.

The generated power can alternatively be handled with a regenerative variable frequency drive that has an active converter instead of the one-way diode rectifier. An active converter allows power to flow from the AC source to the DC bus and from the DC bus back to the AC source. A regenerative variable frequency drive puts the generated power back onto the line, and thereby reduces the total power consumption of the load.

Regenerative variable frequency drives for three-phase input and output are known. A conventional diode rectifier drive can convert AC power from a single-phase source to charge the DC bus. The known three-phase active converters cannot convert the power from a single-phase AC source to charge the DC bus.

Three-phase AC power is generally supplied to industrial areas. However, only single phase AC power is available to most residential and rural areas. The single phase AC power available in most residential and rural areas is provided by a step down transformer connected to a high voltage line and, in the United States, is normally supplied as about 240 volts at 60 Hz between the first and second input lines. Many three-phase induction motors are operated at high voltage such as about 460 volts to reduce the current passing between the inverter of the variable frequency drive and the motor, and thereby reducing the required size of the connecting cables. Diode rectifier converters cannot directly boost the incoming 240 volts to 460 volts.

Diode rectifiers distort the current drawn from the power grid. This distortion creates harmonic distortions that may affect other users on the grid. The distortion also reduces the power factor. A variable frequency drive with a diode rectifier therefore requires additional circuitry for power factor correction and harmonic filtering.

Some of the more common loads on phase converting variable frequency drives are water pumps, HVAC systems and oil pump jacks. Harmonic distortion of the input current caused by phase converting variable frequency drives is much higher than variable frequency drives with three-phase input because of the large 3rd harmonic associated with the single-phase input. Single-phase passive filters that meet IEEE-519 standards are expensive and not readily available. Single-phase passive filters also have disadvantages such as resonance with the utility, large size and weight, and possible unsuitability for variable loads. In addition to these limitations, passive filters must be designed for particular frequencies and thus may not affect all of the harmonic currents.

One method to reduce input harmonics from phase converting variable frequency drives is the use of an active switching full bridge rectifier. An active switching full bridge rectifier includes power transistors and diodes in the rectifier to actively control the waveform of the input current. An active switching full bridge rectifier improves the input power factor by controlling the input current waveform distortion and is regenerative, allowing power to flow both directions, in and out of the drive. U.S. Pat. No. 8,941,340 to Meiners et al. discloses a regenerative variable frequency drive including an active single phase converter connected to a three phase inverter.

Different control methods have been used to control a single-phase converter with an active switching full bridge. The main control methods for single-phase converters with an active switching full bridge are unipolar voltage switching (UVS) and bipolar voltage switching (BVS). Unipolar voltage switching and bipolar voltage switching each have advantages and disadvantages. The advantages of a unipolar voltage switching scheme are lower switching loss, lower harmonics and an effective switching frequency that is double the actual switching frequency. The advantages of bipolar voltage switching scheme are effectively controlling the current at zero crossing and less ripple current. Hybrid control for Current Source Inverters (CSI) has been proposed to avail the advantages of both unipolar voltage switching and bipolar voltage switching.

DISCLOSURE OF THE INVENTION

A regenerative variable frequency drive for converting single phase AC power to variable frequency three phase AC power includes a single phase AC power source, a DC bus, a first inverter that converts DC power to variable frequency, three phase AC power, and variable frequency, three phase AC power to DC power, a second inverter that converts DC power to three phase sine wave power, and an active converter that converts single phase AC power to DC power and DC power to single phase AC power. The converter includes first and second input lines connected to the source, first, second, third and fourth switches, first, second, third and fourth diodes, and a controller. The emitter of the first switch and the collector of the second switch connect to the first input line and the emitter of the third switch and the collector of the fourth switch connect to the second input line. The collectors of the first and third switches connect to the positive bus bar, the emitters of the second and fourth switches connecting to the negative bus bar. The anode of each diode connects to the emitter of the respective switch and cathode of each diode connects to the collector of the respective switch. The controller connects to the bases of the switches and drives the switches with a pulse width modulation according to a hybrid voltage switching scheme such that the switches are switched according to a unipolar voltage switching scheme through most of each cycle while the switches are switched according to a bipolar voltage switching scheme around each zero crossing.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
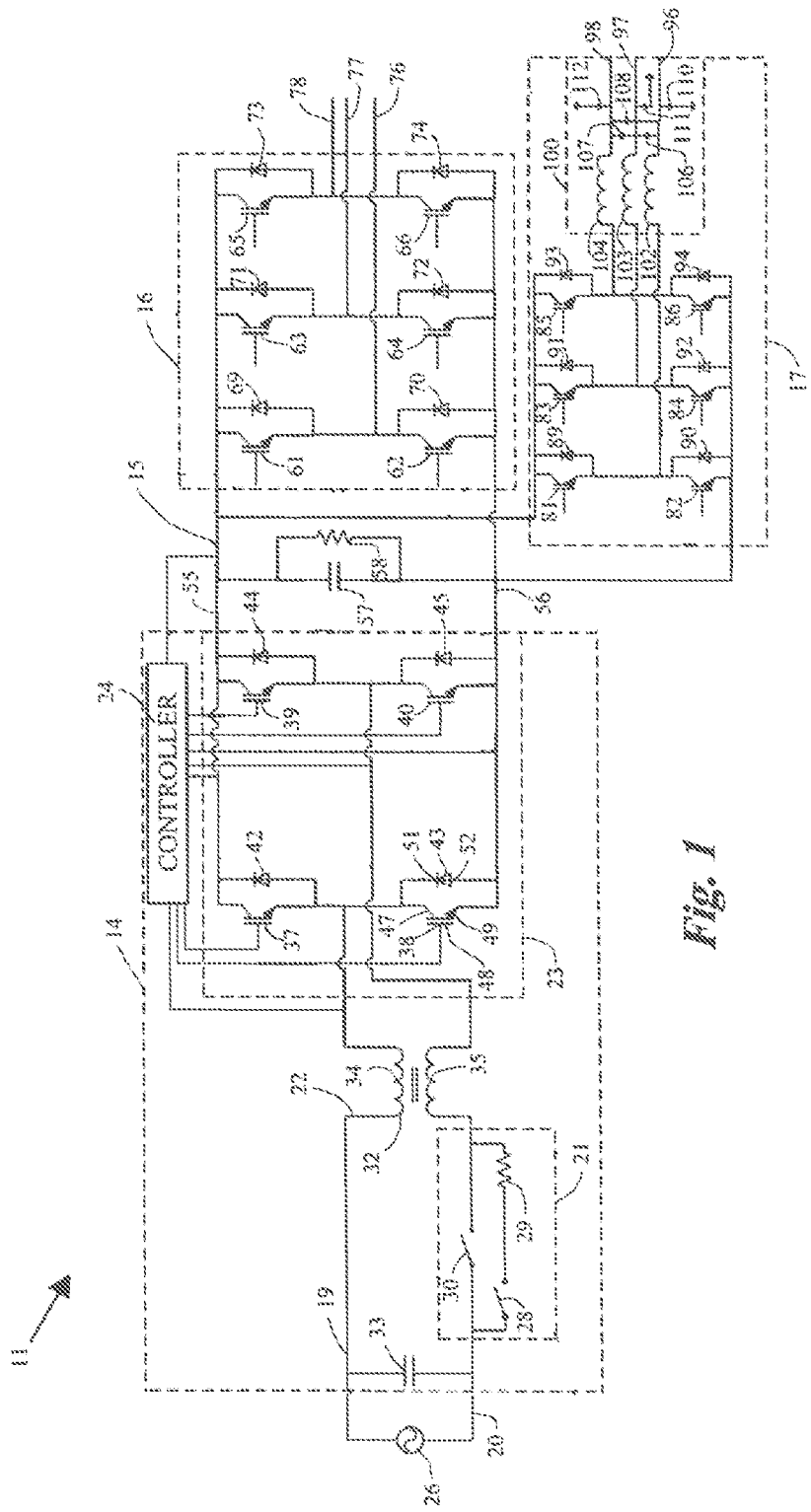
FIG. 1 is a schematic diagram of a variable frequency drive embodying the features of the present invention.

Referring to FIG. 1, a regenerative variable frequency drive 11, embodying the features of the present invention, includes an active converter 14, a DC bus 15 connect to the converter 14, and first and second inverters 16 and 17 connected to the DC bus 15. The converter 14 includes first and second input lines 19 and 20, a precharging circuit 21, an input filter 22, an active rectifier 23 and a controller 24. The first and second input lines 19 and 20 connect to a single phase AC source 26. Generally, the source 26 will be a utility power grid. In the United States, the source 26 will typically provide power at 240V at 60 Hz.

The precharging circuit 21 connects along the second input line 20 and includes a first switch 28 connected in series to a resistor 29, and a second switch 30 connected in parallel to the first switch 28 and the resistor 30. During startup of the drive 11, the first switch 28 is closed and the second switch 30 is open so that current passes through resistor 29 to avoid excessively high input current when power is applied to the converter 14. After the DC bus 15 is charged, the second switch 30 is closed to bypass resistor 29.

The input filter 22 has a filter inductor 32 and a filter capacitor 33. The filter inductor 32 has a first coil 34 that connects along the first input line 19 and a second coil 35 that connects along the second input line 20 with the precharging circuit 21 between the second coil 35 and the source 26. The filter capacitor 33 connects from the first input line 19 between the first coil 34 and the source 26 and to the second input line 20 between the precharging circuit 21 and the source 26.

The rectifier 23 is an active switching full bridge rectifier with first, second, third and fourth switches 37, 38, 39 and 40, and first, second, third and fourth diodes 42, 43, 44 and 45. The first, second, third and fourth switches 37, 38, 39 and 40 each have a collector 47, a base 48 and an emitter 49. The first, second, third and fourth switches 37, 38, 39 and 40 are preferably solid state switches and more preferably Insulated Gate Bipolar Transistors (IGBT). The first, second, third and fourth diodes 42, 43, 44 and 45 each have an anode 51 and a cathode 52.

The emitter 49 of the first switch 37 and the collector 47 of the second switch 38 connect to the first input line 19 on the side of the input filter 22 that is opposite the source 26. The emitter 49 of the third switch 39 and the collector 47 of the fourth switch 40 connect to the second input line 20 on the side of the input filter 22 that is opposite the source 26.

The anode 51 of the first diode 42 connects to the emitter 49 of the first switch 37. The cathode 52 of the first diode 42 connects to the collector 47 of the first switch 37. The anode 51 of the second diode 43 connects to the emitter 49 of the second switch 38. The cathode 52 of the second diode 43 connects to the collector 47 of the second switch 38. The anode 51 of the third diode 44 connects to the emitter 49 of the third switch 39. The cathode 52 of the third diode 44 connects to the collector 47 of the third switch 39. The anode 51 of the fourth diode 45 connects to the emitter 49 of the fourth switch 40. The cathode 52 of the fourth diode 45 connects to the collector 47 of the fourth switch 40.

The controller 24 connects to the bases 48 of the first, second, third and fourth switches 37, 38, 39 and 40 and drives the first, second, third and fourth switches 37, 38, 39 and 40. The controller 24 connects to the first input line 19 to monitor input current and voltage, and to the DC bus 15 to monitor the DC voltage on the DC bus 15.

The DC bus 15 includes a positive bus bar 55, a negative bus bar 56, a bus capacitor 57 and a bus resistor 58. The positive bus bar 55 connects to the collectors 47 of the first and third switches 37 and 39. The negative bus bar 56 connects to the emitters 49 of the second and fourth switches 38 and 40. The bus capacitor 57 and the bus resistor 58 connect in parallel from the positive bus bar 55 to the negative bus bar 56.

The first inverter 16 has first, second, third, fourth, fifth and sixth switches 61, 62, 63, 64, 65 and 66, first, second, third, fourth, fifth and sixth diodes 69, 70, 71, 72, 73 and 74, and first, second and third output lines 76, 77 and 78. The first, second, third, fourth, fifth and sixth switches 61, 62, 63, 64, 65 and 66 each have a collector 47, a base 48 and an emitter 49. The first, second, third, fourth, fifth and sixth switches 61, 62, 63, 64, 65 and 66 are preferably solid state switches and more preferably Insulated Gate Bipolar Transistors (IGBT). The first, second, third, fourth, fifth and sixth diodes 69, 70, 71, 72, 73 and 74 each have an anode 51 and a cathode 52.

The anode 51 of each of the first, second, third, fourth, fifth and sixth diodes 69, 70, 71, 72, 73 and 74 connects to the emitter 49 of the respective first, second, third, fourth, fifth or sixth switch 61, 62, 63, 64, 65 or 66. The cathode 52 of each of the first, second, third, fourth, fifth and sixth diodes 69, 70, 71, 72, 73 and 74 connects to the collector 47 of the respective first, second, third, fourth, fifth or sixth switch 61, 62, 63, 64, 65 or 66. The collectors 47 of the first, third and fifth switch 61, 63 and 65 connect to the positive bus bar 55 and the emitters 49 of the second, fourth and sixth switches 62, 64 and 66 connect to the negative bus bar 56.

The emitter 49 of the first switch 61 and the collector 47 of the second switch 62 connect to the first output line 76. The emitter 49 of the third switch 63 and the collector 47 of the fourth switch 64 connect to the second output line 77. The emitter 49 of the fifth switch 65 and the collector 47 of the sixth switch 66 connect to the third output line 78. The first, second and third output lines 76, 77 and 78 of the first inverter 16 can connect to and drive a load such as a three phase induction motor.

The second inverter 17 has first, second, third, fourth, fifth and sixth switches 81, 82, 83, 84, 85 and 86, first, second, third, fourth, fifth and sixth diodes 89, 90, 91, 92, 93 and 94, first, second and third output lines 96, 97 and 98 and a sine wave filter 100. The first, second, third, fourth, fifth and sixth switches 81, 82, 83, 84, 85 and 86 each have a collector 47, a base 48 and an emitter 49. The first, second, third, fourth, fifth and sixth switches 81, 82, 83, 84, 85 and 86 are preferably solid state switches and more preferably Insulated Gate Bipolar Transistors (IGBT). The first, second, third, fourth, fifth and sixth diodes 89, 90, 91, 92, 93 and 94 each have an anode 51 and a cathode 52.

The anode 51 of each of the first, second, third, fourth, fifth and sixth diodes 89, 90, 91, 92, 93 and 94 connects to the emitter 49 of the respective first, second, third, fourth, fifth or sixth switch 81, 82, 83, 84, 85 or 86. The cathode 52 of each of the first, second, third, fourth, fifth and sixth diodes 89, 90, 91, 92, 93 and 94 connects to the collector 47 of the respective first, second, third, fourth, fifth or sixth switch 81, 82, 83, 84, 85 or 86. The collectors 47 of the first, third and fifth switches 81, 83 and 85 connect to the positive bus bar 55 and the emitters 49 of the second, fourth and sixth switches 82, 84 and 86 connect to the negative bus bar 56.

The emitter 49 of the first switch 81 and the collector 47 of the second switch 82 connect to the first output line 96. The emitter 49 of the third switch 83 and the collector 47 of the fourth switch 84 connect to the second output line 97. The emitter 49 of the fifth switch 85 and the collector 47 of the sixth switch 86 connect to the third output line 98.

The sine wave filter 100 has first, second and third inductors 102, 103 and 104, first, second and third line capacitors 106, 107 and 108, and first, second and third ground capacitors 110, 111 and 112. The first, second and third inductors 102, 103 and 104 connect along the first, second and third output lines 96, 97 and 98, respectively. The first line capacitor 106 connects between the first and second output lines 96 and 97. The second line capacitor 107 connects between the second and third output lines 97 and 98. The third line capacitor 106 connects between the first and third output lines 96 and 98. The first, second and third ground capacitors 110, 111 and 112 connect from the first, second and third output lines 96, 97 and 98, respectively, to ground. The first, second and third output lines 96, 97 and 98 of the second inverter 16 can connect to and drive electronic sensors, communication devices and control equipment.

The controller 24 drives the converter 14 to maintain a selected voltage on the DC bus 15. Proportional integral (PI) control is used to regulate the DC bus voltage $V_{dc}$ to the reference value $V_{dc}^*$. The DC reference voltage must be higher than or equal to the magnitude of the source peak voltage for satisfactory operation of the converter 14. The current command amplitude $I_m$ for the converter 14 can be presented by $$I_m = (K_p(V_{dc}^* - V_{dc}) + K_I \int (V_{dc}^* - V_{dc})dt)$$

where $K_p$ is the proportional gain constant and $K_I$ is the integral gain constant of the PI control.

In order to achieve unity power factor, the converter current command $i_f^*$ is constrained as follows $$i_f^* = I_m \sin \omega t$$

where $\omega$ is the input angular frequency and is calculated by using a Phase Locked Loop (PLL)

Figure 2:
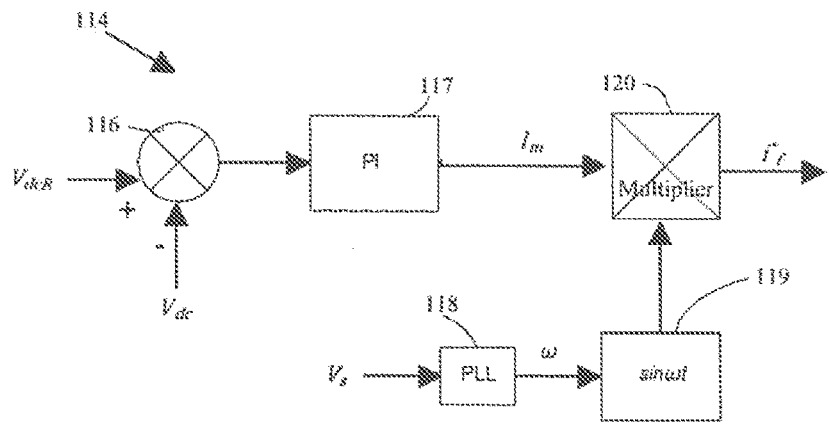
FIG. 2 is a block diagram of a current reference generator circuit of the variable frequency drive of FIG. 1.

The controller 24 includes a current reference generator 114, shown in FIG. 2. The current reference generator 114 has a voltage comparator 116, a proportional integral control 117, a phase locked loop 118, sine function block 119, and a multiplier block 120. The voltage comparator 116 compares the reference DC voltage value $V_{dc}^*$ to the voltage $V_{dc}$ on the DC bus 15. The voltage comparator 116 connects to the proportional integral control 117 and the proportional integral control 117 generates the current command amplitude $I_m$ from the output error from the voltage comparator 116. The phase locked loop 118 estimates the phase angle $\omega$ of the voltage $V_s$ from the source 26. The phase locked loop 118 is connected to the sine function block 119 and the sine function block 119 generates a phase sine signal sin $\omega t$. The multiplier block 120 connects to the proportional integral control 117 and the sine function block 119, and multiplies the current command amplitude $I_m$ by the phase sine signal sin $\omega t$ to generate the current reference command $i_f^*$. The controller 24 drives the converter 14 to match the measured current $i_f$ from the source 26 to the current reference command $i_f^*$.

Figure 3:
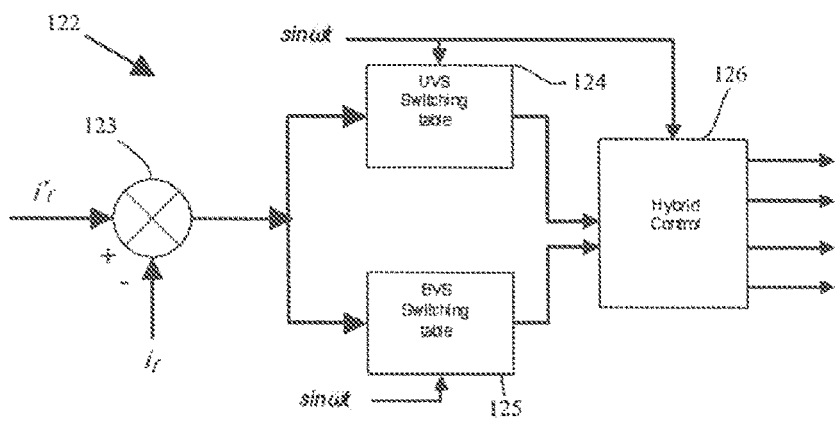
FIG. 3 is a block diagram of a hybrid hysteresis control for the AC-DC converter of the variable frequency drive of FIG. 1.

Referring to FIG. 3, the controller 24 includes a hybrid hysteresis control 122 with a first current comparator 123 connected to a unipolar voltage switching table 124 and to a bipolar voltage switching table 125, and a hybrid control 126 connected to the unipolar and bipolar switching tables 124 and 125. The first current comparator 123 compares the reference current command $i_f^*$ with the measured current $i_f$ from the source 26. The unipolar and bipolar switching tables 124 and 125, and hybrid control 126 connect to the sine function block 119. The hybrid control 126 connects to the bases 48 of the first, second, third and fourth switches 37, 38, 39 and 40 and drives the first, second, third and fourth switches 37, 38, 39 and 40 with a pulse width modulation according to a hybrid voltage switching scheme, described hereinafter.

Figure 4:
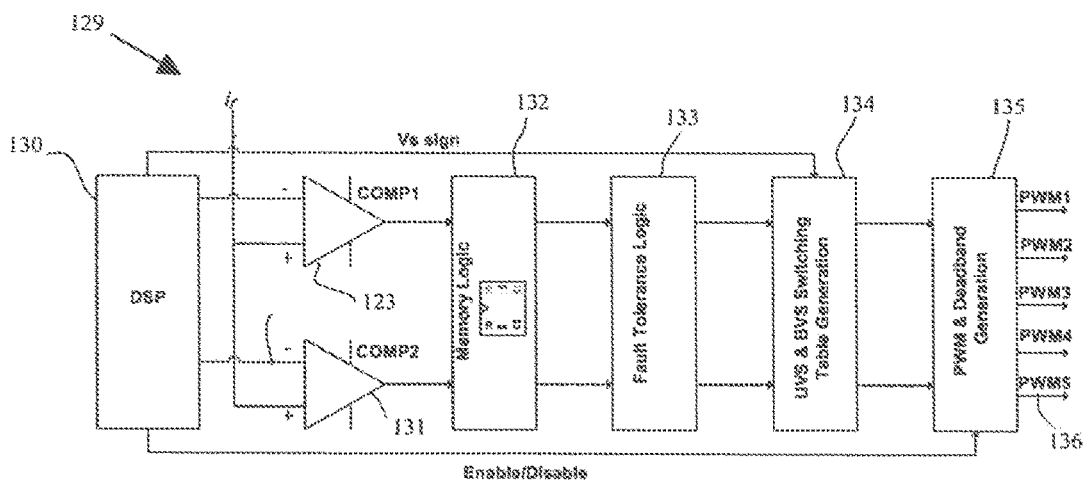
FIG. 4 is a block diagram of a pulse width modulation circuit of the variable frequency drive of FIG. 1.

The controller 24 includes a pulse width modulation circuit 129, shown in FIG. 4, that implements the hybrid hysteresis control 122. The pulse width modulation circuit 129 includes a digital signal processor 130, the first current comparator 123, a second current comparator 131, memory logic 132, fault tolerant logic 133, a switching table generator 134 and a pulse width modulation generator 135. The first and second current comparators 123 and 131 connect to and receive the reference current command $i_f^*$ from the digital signal processor 130.

The first and second current comparators 123 and 131 compare the reference current command $i_f^*$ with the measured current $i_f$ from the source 26. The output of the first and second current comparators 123 and 131 is fed to the memory logic 132, and the output of the memory logic 132 is fed to the fault tolerant logic 133. The fault tolerant logic 133 is inserted to prevent unwanted states so that the Q and −Q from the memory logic 132 are never the same. The switching table generator 134 receives the output of the fault tolerant logic 133, and generates the unipolar and bipolar switching tables. The unipolar and bipolar switching tables are fed to the pulse width modulation generator 135. The pulse width modulation generator 135 drives the first, second, third and fourth switches 37, 38, 39 and 40. The pulse width modulation generator 135 includes a deadband 136, labeled PWM5.

The controller connects to the bases 48 of and drives the first, second, third and fourth switches 37, 38, 39 and 40 with a pulse width modulation according to a hybrid voltage switching scheme such that the first, second, third and fourth switches 37, 38, 39 and 40 are switched according to a unipolar voltage switching scheme through most of each cycle while the first, second, third and fourth switches 37, 38, 39 and 40 are switched according to a bipolar voltage switching scheme around each zero crossing. For example, the first, second, third and fourth switches 37, 38, 39 and 40 can be switched according to a bipolar voltage switching scheme within about ±14° of each zero crossing and switched according to a unipolar voltage switching scheme during the remainder of each cycle.

In the unipolar voltage switching scheme, one leg of the converter 14 is commutated at the switching frequency and the other leg is commutated at the fundamental frequency of the source voltage. In the following description the first switch 37 is Z1, the second switch 38 is Z2, the third switch 39 is Z3 and the fourth switch 40 is Z4. The possible switching combinations for unipolar voltage switching are:

I. Switches Z2 & Z3 are ON and Z1 & Z4 are OFF when $i_f > (i_f^* + HB_U)$ and $V_s > 0$
The voltage of the filter inductor 32 is written as $$V_L = L\frac{di_f}{dt} = V_s - V_{dc} < 0$$

where $HB_U$ is the upper limit of the hysteresis band.

II. Switches Z1 & Z3 are ON and Z2 & Z4 are OFF when $i_f < (i_f^* + HB_L)$ and $V_s > 0$
The voltage of the filter inductor 32 is written as $$V_L = L\frac{di_f}{dt} = V_s > 0$$

where $HB_L$ is the lower limit of the hysteresis band.

III. Switches Z1 & Z4 are ON and Z2 & Z3 are OFF when $i_f < (i_f^* + HB_L)$ and $V_s < 0$
The voltage of the filter inductor 32 is written as $$V_L = L\frac{di_f}{dt} = V_s + V_{dc} > 0$$

IV. Switches Z1 & Z3 are ON and Z2 & Z4 are OFF when $i_f > (i_f^* + HB_U)$ and $V_s < 0$
The voltage of the filter inductor 32 is written as $$V_L = L\frac{di_f}{dt} = V_s < 0$$

Figure 5:
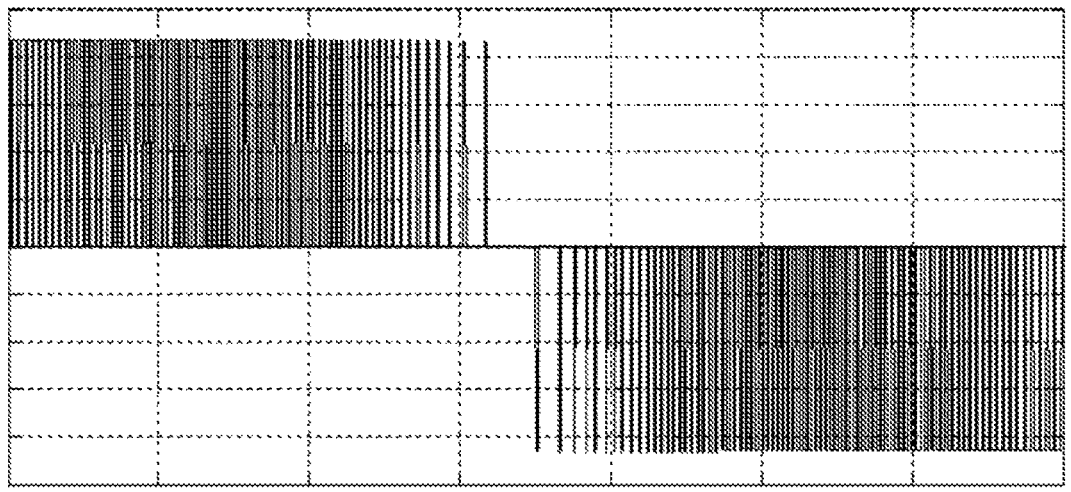
FIG. 5 is a waveform diagram of the voltage of a unipolar voltage switching scheme.
Figure 6:
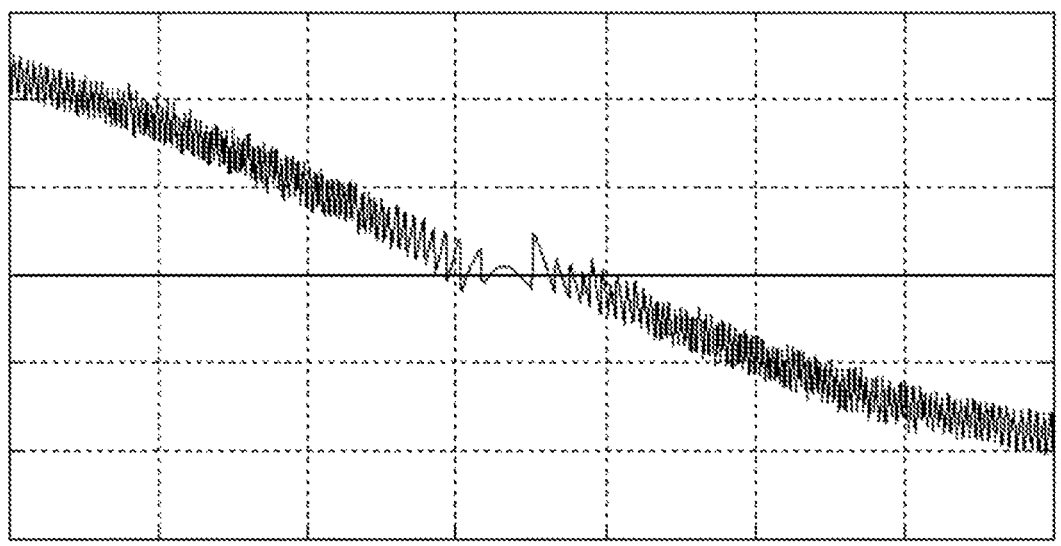
FIG. 6 is a waveform diagram of the current of a unipolar voltage switching scheme.

The voltage and current between the first and second input lines 19 and 20 for the unipolar voltage switching scheme around a zero crossing are shown in FIGS. 5 and 6, respectively. The voltage is changed between zero and $+V_{dc}$ or between zero and $-V_{dc}$. The Total Harmonic Distortion (THD) and total switching losses are very small with the unipolar voltage switching scheme. The main disadvantage of the unipolar voltage switching scheme is that the pulses are narrow at the zero voltage crossing, causing current waveform distortion.

In the bipolar voltage switching scheme, switches Z2 & Z3 form one pair and switches Z1 & Z4 form another pair which commutate at the switching frequency. The possible switching combinations for bipolar voltage switching are:

I. Switches Z2 & Z3 are ON and Z1 & Z4 are OFF when $i_f > (i_f^* + HB_U)$ and $V_s > 0$
The inductor voltage is written as $$V_L = L\frac{di_f}{dt} = V_s - V_{dc} < 0$$

II. Switches Z1 & Z4 are ON and Z2 & Z3 are OFF when $i_f < (i_f^* + HB_L)$ and $V_s > 0$
The inductor voltage is written as $$V_L = L\frac{di_f}{dt} = V_s + V_{dc} > 0$$

III. Switches Z1 & Z4 are ON and Z2 & Z3 are OFF when $i_f < (i_f^* + HB_L)$ and $V_s < 0$
The inductor voltage is written as $$V_L = L\frac{di_f}{dt} = V_s + V_{dc} > 0$$

IV. Switches Z2 & Z3 are ON and Z1 & Z4 are OFF when $i_f > (i_f^* + HB_U)$ and $V_s < 0$
The inductor voltage is written as $$V_L = L\frac{di_f}{dt} = V_s - V_{dc} < 0.$$

Figure 7:
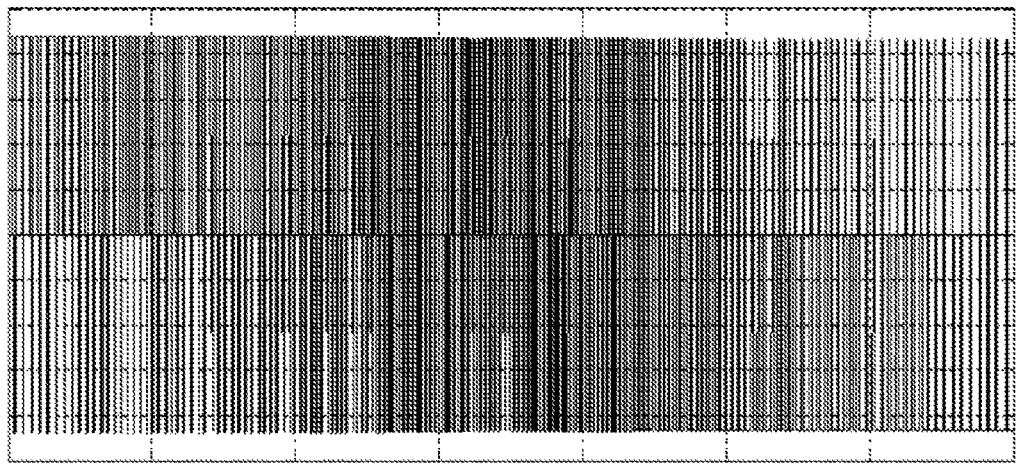
FIG. 7 is a waveform diagram of the voltage of a bipolar voltage switching scheme.
Figure 8:
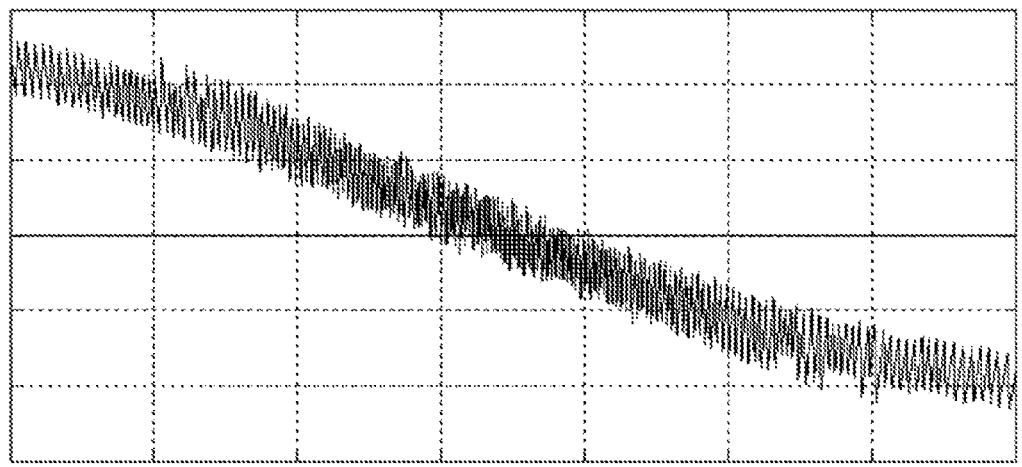
FIG. 8 is a waveform diagram of the current of a bipolar voltage switching scheme.
Figure 9:
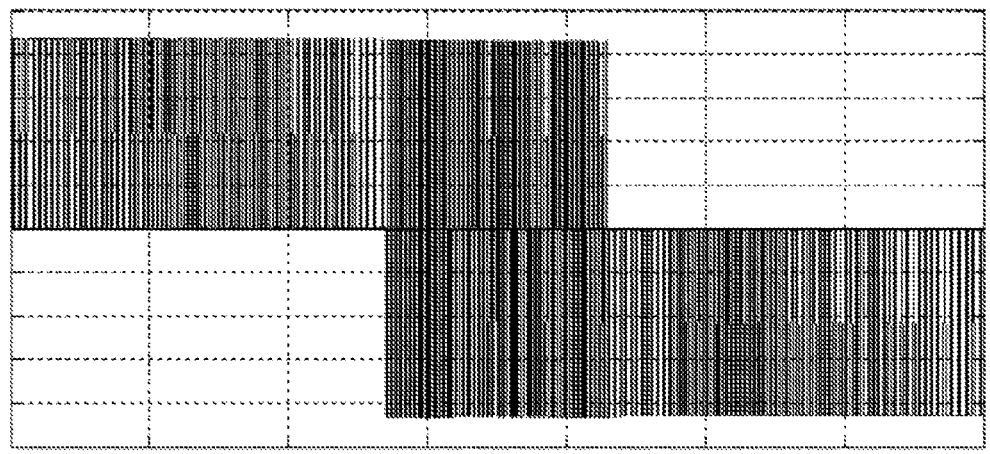
FIG. 9 is a waveform diagram of the voltage of the hybrid voltage switching scheme of the variable frequency drive of FIG. 1.
Figure 10:
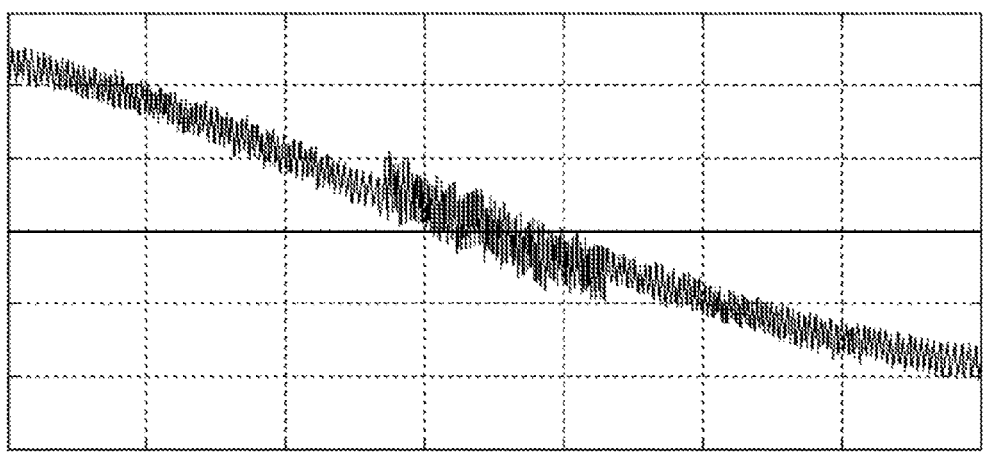
FIG. 10 is a waveform diagram of the current of a hybrid voltage switching scheme of the variable frequency drive of FIG. 1.

As shown in FIG. 7, for the bipolar voltage switching scheme, the input voltage between first and second input lines 19 and 20 changes between $+V_{dc}$ and $-V_{dc}$, and, as shown in FIG. 8, the current control at the zero voltage crossing is much better than with the unipolar voltage switching. The voltage and current between the first and second input lines 19 and 20 for the hybrid voltage switching scheme around a zero crossing are shown in FIGS. 9 and 10, respectively. The hybrid voltage switching control is used to get the advantages of both voltage switching schemes. The bipolar voltage switching scheme is used only in the zero crossing regions and unipolar voltage switching scheme is used in the remaining region.

Although the present invention has been described with a certain degree of particularity, it is understood that the present disclosure has been made by way of example and that changes in details of structure may be made without departing from the spirit thereof.

What is claimed is:
1. A regenerative variable frequency drive for converting single phase AC power from a power grid to three phase, variable frequency AC power and said three phase, variable frequency AC power to single phase AC power, comprising:
a single phase AC power source, a DC bus having a positive bus bar, a negative bus bar and a bus capacitor, said bus capacitor connecting between said positive and negative bus bars, a first inverter that converts DC power to variable frequency, three phase AC power, and variable frequency, three phase AC power to DC power, said first inverter connecting to said positive and negative bus bars, and an active converter that converts single phase AC power to DC power and DC power to single phase AC power, including:

first and second input lines connected to said source, first, second, third and fourth switches each having a collector, a base and an emitter, said emitter of said first switch and said collector of said second switch connecting to said first input line and said emitter of said third switch and said collector of said fourth switch connecting to said second input line, said collectors of said first and third switches connecting to said positive bus bar, said emitters of said second and fourth switches connecting to said negative bus bar, first, second, third and fourth diodes each having an anode and a cathode, said anode of said first diode connecting to said emitter of said first switch, said cathode of said first diode connecting to said collector of said first switch, said anode of said second diode connecting to said emitter of said second switch, said cathode of said second diode connecting to said collector of said second switch, said anode of said third diode connecting to said emitter of said third switch, said cathode of said third diode connecting to said collector of said third switch, said anode of said fourth diode connecting to said emitter of said fourth switch, and said cathode of said fourth diode connecting to said collector of said fourth switch, and a controller connected to said bases of said first, second, third and fourth switches and driving said switches with a pulse width modulation according to a hybrid voltage switching scheme wherein said first, second, third and fourth switches are switched according to a unipolar voltage switching scheme through most of each cycle while said first, second, third and fourth switches are switched according to a bipolar voltage switching scheme around each zero crossing, to maintain a selected voltage on said DC bus.

2. The variable frequency drive as set forth in claim 1 wherein said converter includes an input filter having a filter inductor and a filter capacitor, said filter inductor having a first coil connecting to said first input line and to said emitter of said first switch and said collector of said second switch, and a second coil connecting to said second input line and to said emitter of said third switch and said collector of said fourth switch, said filter capacitor connecting from said first input line to said second input line.

3. The variable frequency drive as set forth in claim 1 wherein said controller includes a current reference generator that generates a current reference command to drive said first, second, third and fourth switches to maintain a selected DC voltage on said DC bus, said current reference generator connecting to one of said positive and negative bus bars and to one of said first and second input lines, and including a voltage comparator that compares the voltage on said DC bus with a reference DC voltage.

4. The variable frequency drive as set forth in claim 3 wherein said current reference generator includes a proportional integral control block connected to said voltage comparator that generates a current control amplitude from the output of said voltage comparator, a phase locked loop connected to one of said first and second input lines that generates a phase angle of said source, a sine function block connected to said phase locked loop that generates a phase sine signal, and a multiplier block connected to said proportional integral control block and to said sine function block, said multiplier block multiplying the current control amplitude by the phase sine signal and outputting the current reference command.

5. The variable frequency drive as set forth in claim 4 wherein said controller includes a pulse width modulation circuit with a hybrid hysteresis control that generates the pulse width modulation, said hybrid hysteresis control connecting to said current reference generator and to one of said first and second input lines, said hybrid hysteresis control including a first current comparator that compares current from said source with the current reference command.

6. The variable frequency drive as set forth in claim 5 wherein said hybrid hysteresis control includes a unipolar voltage switching table and a bipolar voltage switching table each connected to said current comparator, and a hybrid control connected to said unipolar voltage switching table and said bipolar voltage switching table, said unipolar voltage switching table, said bipolar voltage switching table and said hybrid control connecting to said sine function block.

7. The variable frequency drive as set forth in claim 5 wherein said pulse width modulation circuit includes a digital signal processor connected to said first current comparator and to a second current comparator, memory logic connected to said first and second current comparators, fault tolerant logic connected to said memory logic, a switching table generator connected to said fault tolerant logic, and a pulse width modulation generator connected to said switching table generator, said first and second current comparators connecting to one of said first and second input lines and comparing current from said source with the current reference command, and said pulse width modulation generator generating said pulse width modulation according to said hybrid voltage switching scheme.

8. The variable frequency drive as set forth in claim 1 wherein said controller switches said first, second, third and fourth switches according to a bipolar voltage switching scheme from −14 degrees to +14 degrees relative to each zero crossing and switches said first, second, third and fourth switches according to a unipolar voltage switching scheme through the rest of each cycle.

9. The variable frequency drive as set forth in claim 1 wherein said first, second, third and fourth switches are isolated gate bipolar transistors.

10. The variable frequency drive as set forth in claim 1 wherein said converter includes a bus resistor connected from said positive bus bar to said negative bus bar.

11. The variable frequency drive as set forth in claim 1 wherein said converter includes a precharging circuit connected along one of said first and second input lines, said circuit including a resistor that limits initial current and a switch that bypasses said resistor after said bus capacitor is charged.

12. The variable frequency drive as set forth in claim 1 including a second inverter that converts DC power to three phase AC power, said second inverter connecting to said positive and negative bus bars and including a sine wave filter.

13. A regenerative variable frequency drive for converting single phase AC power from a power grid to three phase, variable frequency AC power and said three phase, variable frequency AC power to single phase AC power, comprising:

a single phase AC power source,
a DC bus having a positive bus bar, a negative bus bar and a bus capacitor, said bus capacitor connecting between said positive and negative bus bars,
a first inverter that converts DC power to variable frequency, three phase AC power, and variable frequency, three phase AC power to DC power, said first inverter connecting to said positive and negative bus bars,
a second inverter that converts DC power to three phase AC power, said second inverter connecting to said positive and negative bus bars and including a sine wave filter, and
an active converter that converts single phase AC power to DC power and DC power to single phase AC power, including:
first and second input lines connected to said source,
first, second, third and fourth switches each having a collector, a base and an emitter, said emitter of said first switch and said collector of said second switch connecting to said first input line and said emitter of said third switch and said collector of said fourth switch connecting to said second input line, said collectors of said first and third switches connecting to said positive bus bar, said emitters of said second and fourth switches connecting to said negative bus bar,
first, second, third and fourth diode each having an anode and a cathode, said anode of said first diode connecting to said emitter of said first switch, said cathode of said first diode connecting to said collector of said first switch, said anode of said second diode connecting to said emitter of said second switch, said cathode of said second diode connecting to said collector of said second switch, said anode of said third diode connecting to said emitter of said third switch, said cathode of said third diode connecting to said collector of said third switch, said anode of said fourth diode connecting to said emitter of said fourth switch, and said cathode of said fourth diode connecting to said collector of said fourth switch, and
a controller connected to said bases of said first, second, third and fourth switches and driving said switches with a pulse width modulation according to a hybrid voltage switching scheme wherein said first, second, third and fourth switches are switched according to a unipolar voltage switching scheme through most of each cycle while said first, second, third and fourth switches are switched according to a bipolar voltage switching scheme around each zero crossing, said controller including a current reference generator that generates a current reference command to drive said first, second, third and fourth switches to maintain a selected DC voltage on said DC bus, said current reference generator connecting to one of said positive and negative bus bars and to one of said first and second input lines, and including a voltage comparator that compares the voltage on said DC bus with a reference DC voltage.

14. The variable frequency drive as set forth in claim 13 wherein said converter includes a precharging circuit connected along one of said first and second input lines, said circuit including a resistor that limits initial current and a switch that bypasses said resistor after said first and second bus capacitors are charged.

15. An active converter that converts single phase AC power to DC power and DC power to single phase AC power, for a regenerative variable frequency drive that converts single phase AC power from a power grid to three phase, variable frequency AC power and said three phase, variable frequency AC power to single phase AC power, said variable frequency drive including a DC bus having a positive bus bar and a negative bus bar, said converter comprising:
a single phase AC power source,
first and second input lines connected to said source,
first, second, third and fourth switches each having a collector, a base and an emitter, said emitter of said first switch and said collector of said second switch connecting to said first input line and said emitter of said third switch and said collector of said fourth switch connecting to said second input line, said collectors of said first and third switches connecting to said positive bus bar, said emitters of said second and fourth switches connecting to said negative bus bar,
first, second, third and fourth diodes each having an anode and a cathode, said anode of said first diode connecting to said emitter of said first switch, said cathode of said first diode connecting to said collector of said first switch, said anode of said second diode connecting to said emitter of said second switch, said cathode of said second diode connecting to said collector of said second switch, said anode of said third diode connecting to said emitter of said third switch, said cathode of said third diode connecting to said collector of said third switch, said anode of said fourth diode connecting to said emitter of said fourth switch, and said cathode of said fourth diode connecting to said collector of said fourth switch, and
a controller connected to said bases of said first, second, third and fourth switches and driving said switches with a pulse width modulation according to a hybrid voltage switching scheme wherein said first, second, third and fourth switches are switched according to a unipolar voltage switching scheme through most of each cycle while said first, second, third and fourth switches are switched according to a bipolar voltage switching scheme around each zero crossing, to maintain a selected voltage on said DC bus.

16. The converter as set forth in claim 15 wherein said controller includes a current reference generator that generates a current reference command to drive said first, second, third and fourth switches to maintain said selected DC voltage on said DC bus, said current reference generator connecting to one of said positive and negative bus bars and to one of said first and second input lines, and including a voltage comparator that compares the voltage on said DC bus with a reference DC voltage.

17. The converter as set forth in claim 16 wherein said current reference generator includes a proportional integral control block connected to said voltage comparator that generates a current control amplitude from the output of said voltage comparator, a phase locked loop connected to one of said first and second input lines that generates a phase angle of said source, a sine function block connected to said phase locked loop that generates a phase sine signal, and a multiplier block connected to said proportional integral control block and to said sine function block, said multiplier block multiplying the current control amplitude by the phase sine signal and outputting the current reference command.

18. The converter as set forth in claim 17 wherein said controller includes a pulse width modulation circuit with a hybrid hysteresis control that generates the pulse width modulation, said hybrid hysteresis control connecting to said current reference generator and to one of said first and second input lines, said hybrid hysteresis control including a first current comparator that compares current from said source with the current reference command.

19. The converter as set forth in claim 18 wherein said hybrid hysteresis control includes a unipolar voltage switching table and a bipolar voltage switching table each connected to said current comparator, and a hybrid control connected to said unipolar voltage switching table and said bipolar voltage switching table, said unipolar voltage switching table, said bipolar voltage switching table and said hybrid control connecting to said sine function block.

20. The converter as set forth in claim 18 wherein said pulse width modulation circuit includes a digital signal processor connected to said first current comparator and to a second current comparator, memory logic connected to said first and second current comparators, fault tolerant logic connected to said memory logic, a switching table generator connected to said fault tolerant logic, and a pulse width modulation generator connected to said switching table generator, said first and second current comparators connecting to one of said first and second input lines and comparing current from said source with the current reference command, and said pulse width modulation generator generating said pulse width modulation according to said hybrid voltage switching scheme.

21. The converter as set forth in claim 15 wherein said controller switches said first, second, third and fourth switches according to a bipolar voltage switching scheme from −14 degrees to +14 degrees relative to each zero crossing and switches said first, second, third and fourth switches according to a unipolar voltage switching scheme through the rest of each cycle.

\* \* \* \* \*